Nov. 20, 1951 W. O. TEETERS 2,575,775
DIAPHRAGM VALVE

Filed Sept. 4, 1945 2 SHEETS—SHEET 1

W.O. TEETERS
INVENTOR

BY
ATTORNEY

Patented Nov. 20, 1951

2,575,775

UNITED STATES PATENT OFFICE 2,575,775

DIAPHRAGM VALVE

Wilbur O. Teeters, Norwood, N. J., assignor, by mesne assignments, to the United States of America as represented by the United States Atomic Energy Commission Application September 4, 1945, Serial No. 614,404

4 Claims. (Cl. 251—31)

This invention relates to a valve and particularly to a valve which may be operated by hand to regulate the flow of corrosive fluids.

In certain chemical processes corrosive gases, such as hydrogen fluoride, chlorine, and metallic fluorides are employed, their flow being regulated by valves of appropriate construction. Ordinary valves have been found unsuited to this work because of leakage and because valve parts are attacked by the gases. Considering the highly developed state of the valve art, it would be thought to be a simple matter to find satisfactory valves to fill any engineering need, but this has not proved to be the case in connection with gases of the type indicated. It is therefore an object of this invention to design and construct a valve having parts that will not be easily attacked by the gases, that will be positive in control, and that can be made in large quantities by processes adapted to commercial employment.

Another object of the invention is to construct a valve having a wall of diaphragm type sealed by fused metal, the seals and diaphragm of which can be subjected to inspection. Another object is to subject certain parts of a valve to sealing by fusion after assembly, to protect the valve body from the intense heat, and to prevent destruction of other parts of the valve assembly. Yet another object of the invention is to accomplish the purposes of a conical valve seat in a superior manner without the use of two interfitting conical surfaces, and to secure improved sealing by the use of a valve point or a valve seat of novel construction.

The objects of the invention are obtained generally speaking by the employment of the principles which are exemplified in the valve whose description follows. Other objects of the invention and the advantages of the general construction and of constructional details will be set forth as the description proceeds.

Figure 3:
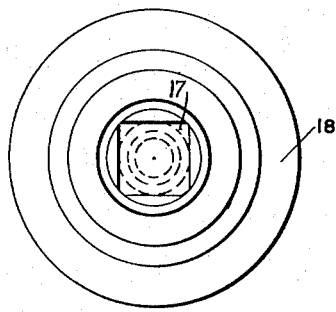
Figure 1:
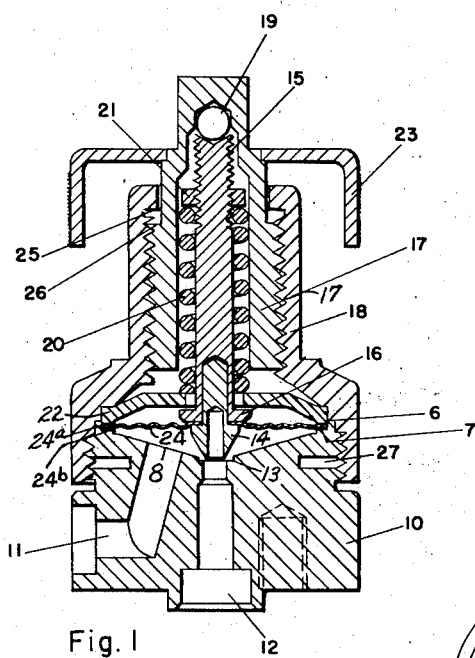
Figure 4:
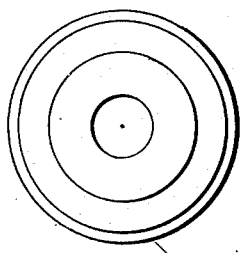
Figure 2:
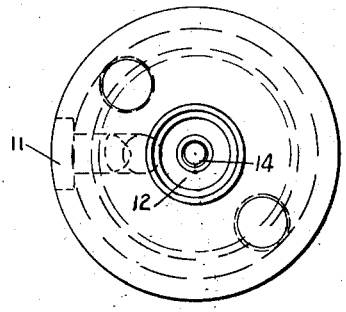
Figure 5:
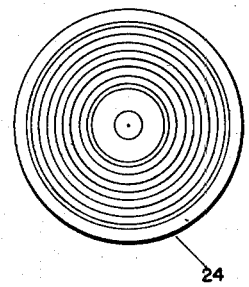
Figure 6:
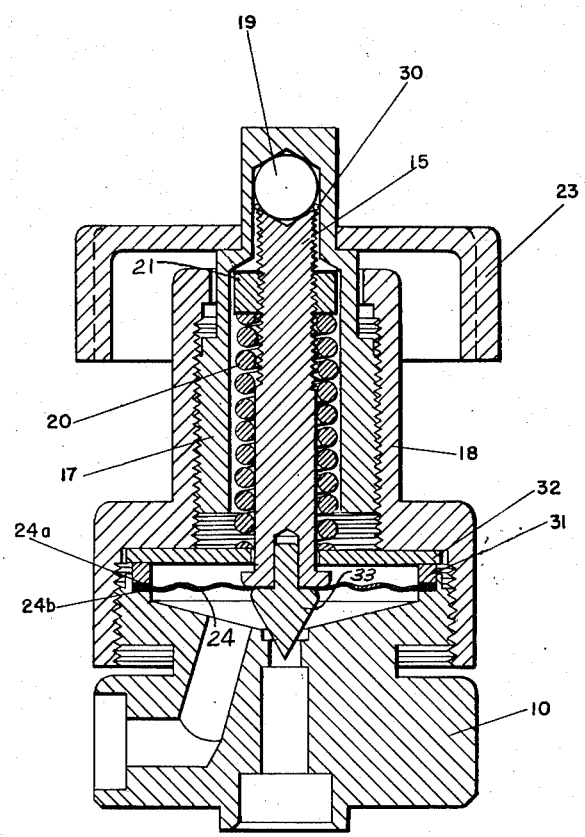

In the drawings, Fig. 1 is a vertical sectional view through a valve embodying the principles of the invention; Fig. 2 is an inverted plan view of the valve shown in Fig. 1; Fig. 3 is a plan view of the valve; Fig. 4 is a plan view of the limit plate; Fig. 5 is a plan view of the diaphragm; Fig. 6 is a vertical sectional view through a modification of the invention having a number of advantages.

Referring to the figures of the drawing and to the numerals thereof in which like numerals refer to like parts, there is a base member 10 having passages 11 and 12, which communicate between the outer and the upper surfaces thereof. The base member has a reduced and screw-threaded outer wall terminating in an annular flange 6 which serves to center a diaphragm 24 and a limit plate 22. The surface of the base member is continued inwardly from the flange 6, as an annular shoulder 7 that is designed to receive the edge of the diaphragm 24, and as a conical surface 8 that terminates at its center in a recessed valve seat 13 at the end of the passage 12. The base member may be provided with tappings for mounting bolts or with other means by which the valve may be fixed in operating position. The angle of the conical surface is selected with great care because it determines the location of the valve seat 13 which must be accurately placed to avoid strain on the diaphragm and imperfect seating of the valve point on the valve seat.

In the figures, the valve seat is made by providing at the inner end of the passage 12 an annular groove 13, or multiplicity of grooves, designed to provide spaced annular valve seats of different diameters so that the seating surfaces lie on the surface of a projected cone with the same configuration as the conical valve point 14, or preferably a projected cone with a larger apex angle than the conical valve point. There is thus provided a multiple seal between the valve point and the valve seat that has advantages over the seal provided by a conical seat. The groove 13 in the base forms a valve seat at both of its annular edges. In the preferred construction the groove is so formed that the lower and inner annular edge makes sealing contact with the valve point 14 slightly before contact is made by the valve point with the upper, outer annular edge of the groove. As the point and the first seat wear slightly in use, the second sealing contact is made between the upper, outer edge of the groove and the valve point. Therefore, as time passes the sealing of the valve becomes increasingly perfect, in distinction to prior art valves that tended to become worn out and to seat imperfectly after use.

The single groove is illustrative of the principle. Double grooves will provide three seats, and it is possible to increase the number of seats indefinitely, by a pyramid of grooves, to whatever extent is permitted by the technical needs and economic factors of a particular situation. Alternatively, the seat in the base may have an ungrooved conical surface, and the point may be provided with a plurality of seats by cutting a plurality of pyramidally arranged grooves in its surface. In some cases, also, it may be desirable to have the first contact of the valve members made at the upper outer seat, rather than at the lower inner seat, which can be arranged by appropriate alignment of the cooperating surfaces in making the valve.

The efficiency of this construction is still further increased by the use of a novel valve point, which as shown in Fig. 1 has a hollow point that lends some resiliency to the wall of the point and permits it to conform more readily to minute imperfections in the valve seat and thus to produce a better seal.

When the valve is used in certain chemical processes of the type indicated hereinabove the base member is subjected to the action of corrosive gases or liquids which tend to attack the metal of which it is made, particularly around the valve seat, so that after certain periods of use the valve does not seal perfectly and leakage occurs. In some cases the attack upon the material of the base is so severe that the entire structure tends to disintegrate. It has been observed that the material from which cooperating parts of the valve are made has an influence on the rate of corrosion and it has therefore been an object of this invention to select cooperating materials which jointly act to resist corrosion. It has been found, for example, that type R Monel metal is a satisfactory material from which to make the base member 10.

The upper conical surface 8 of the base forms one wall of a chamber, the other wall of which comprises an annular diaphragm 24, provided with annular concentric corrugations, that is caught at its center and firmly held between a shoulder on the valve point 14 and a flange 16 on the spindle 15. The outer edge of the diaphragm rests upon the shoulder 7 and fits the inner circumference of the flange 6 so that the valve point is accurately centered with respect to the valve seat when the valve is assembled. The valve point 14 is provided with a stud which has a force fit within the hollow point of the spindle 15. Silver soldering may also be used to prevent leakage of gases or liquids past the shoulder of the valve point and the flange of the valve spindle for additional protection against leakage. The spindle 15 may be satisfactorily made of type R Monel metal or Type 303 stainless steel, which are exemplary of satisfactory materials, but the valve point and diaphragm are preferably made of hardened type Z nickel.

The valve spindle 15 passes with a loose fit through a relatively rigid limit plate 22 that has a circumferential flange separated from the outer edge of the diaphragm 24 by a washer of silver solder 24a. A coil spring 20 encompasses the spindle 15 and bears at one end upon the limit plate 22, the other end of the spring being adjustably constrained by a nut 21 mounted upon the upper screw-threaded end of the spindle. The spindle 15 terminates in a seat for a ball bearing 19. The spindle, diaphragm and limit plate structure which has just been described constitutes a sub-assembly which may be put together and mounted as a unit in the valve.

In a preferred method of constructing the sub-assembly the parts are assembled, the diaphragm and point being of unhardened Z nickel, the point is accurately drilled, turned, and the point and diaphragm are hardened by heat treating according to the usual practice for hardening that type of nickel.

Inasmuch as the gases which pass through the valve are sealed away from the spring and the limit plate, those elements may be made of any satisfactory materials. The limit plate may be satisfactorily made of hard drawn brass, and the spring of spring steel, but the diaphragm is preferably Z nickel. In mounting the sub-assembly in the casing a silver-solder washer is laid upon the shoulder 7 within the flange 6, the sub-assembly is mounted on the base with the rim of the diaphragm resting upon the solder washer. When the sub-assembly has been mounted on the shoulder 7 a housing 18, having an inner shoulder circumferentially conforming to the limit plate and having internal screw threads conforming to the screw threads of the base, is screwed down upon the base and bears against the edge of the limit plate 22 to compress the solder washers between the limit plate and the diaphragm and between the shoulder 7 and the diaphragm. The seal is completed by applying an induction coil about the valve wall outside the flange 6 and melting the two solder washers by inductively generated heat. The heat is concentrated in the desired area by an annular groove 27 that circumscribes the base 10 and serves to insulate the lower portions of the base from the heat in the induction area. There is thus constructed a fluid tight chamber that may have communication with inlet and outlet pipes through passages 11 and 12. When this method of construction and assembly are employed, the brass plate 22 may suffer some decrease in strength from the action of the induced heat, but this objection is overcome in the structure shown in Fig. 6.

The upper portion of the housing 18 is cylindrical and is interiorly screw-threaded. An exteriorly screw-threaded bonnet 17 is mounted in the screw threads of the cylindrical portion of housing 18. Ball bearing 19 is held between the seat on the end of the spindle 15 and the seat on the inside of the bonnet 17. The upper end of the housing may be, and preferably is, continued inwardly to form a limiting flange 25, and the screw-threaded portion of the bonnet may be, and preferably is, terminated at 26 to form a limiting shoulder that cooperates to limit in one direction the relative movement of the bonnet and the housing. The bonnet is provided with a knurled, annular handle 23 that is shown as having a circular fit on the bonnet, fixed by the use of silver solder. Other types of fit and other types of connection may be substituted when any advantages are derived from their use. The bonnet may be satisfactorily made of stainless steel and the housing may be made of brass, which are exemplary of satisfactory material types.

It may be assumed, for the purpose of describing the operation of the valve, that passage 12 is an inlet and passage 11 an outlet. If it is desired to close the valve, the handle is rotated clockwise to move the bonnet toward the limit plate and force the spindle down against the opposition of the spring. The corrugated construction of the diaphragm provides extensibility sufficient to let the valve close, and as the bonnet is turned sufficiently along the screw threads of the housing the hollow point of the valve makes contact with the valve seat 13 and seals the chamber against the entrance of gases or liquids.

The hollow point of the valve lends enough resiliency thereto to improve the seating of the valve point in the valve seat. If it is desired to open the valve, the handle 23 is turned in a counterclockwise direction until the valve is opened to the selected flow rate. The compression of the coil spring may be varied by adjusting the nut 21, permitting the adjustment of the valve to compensate for operating conditions of varying pressures.

In the apparatus shown in Fig. 6 are disclosed novel means of construction that are adapted to permit the inspection of the soldered bond at the upper edge of the diaphragm and the cleaning of the housing, to prevent the weakening of the limit plate by the sealing process, and to permit the installation of a pre-hardened point when the preferred method of assembly is not available for use, either from lack of the preferred materials or lack of process facilities.

In this figure of the drawing the base 10, housing 18, spindle 15, spring 20, nut 21, bonnet 17 and handle 23 are substantially like those that have been hereinabove described. The ball 19 is held in the upper part of the bonnet by peening the bonnet material up beneath the ball, or preferably by the use of a retaining ring 30 of suitable construction, in order to prevent the loss of the ball when the valve is dismantled.

The diaphragm is emplaced between silver solder washers, as previously described, but a diaphragm ring 31 of steel and a separate flat steel limit ring 32 replace the limit plate 22 shown in Fig. 1, and the shape of the housing is slightly changed to accommodate these modifications. By this means the chamber is equally well sealed, but the weakening of the limit plate by induced heat is prevented and the top of the diaphragm can be inspected and cleaned by the removal of the washer 32.

The valve point 33 may be made of pre-hardened nickel and mounted as hereinabove described. In this case, therefore, the advantages of the hollow point are lost, but the use of valve points and diaphragms of different materials is facilitated.

Among the advantages of the invention are a valve which is tightly sealed, that has but few parts exposed to corrosion, that is so constructed that the materials best adapted to perform each function of the valve may be used in the construction of each element. The parts of the valve are simply constructed, are easy to assemble and to dismantle, and are suited to commercial manufacture and operation. Other advantages of the invention will be apparent to persons skilled in the art.

Since many embodiments might be made of the present invention and since many changes might be made in the embodiment described, it is to be understood that the foregoing description is to be interpreted as illustrative only and not in a limiting sense.

I claim:

1. A valve comprising an exteriorly threaded base having inlet and outlet passages therethrough and having an annular seat for a membrane and a conical surface proceeding therefrom terminating in a valve seat at the end of one of said passages, a housing threaded on the base and having an annular seat for a limit plate and a conical surface proceeding therefrom terminating in an internally screw-threaded cylinder having an internal limiting flange at its end, a subassembly for the interior of the assembled base and housing comprising a spindle having a screw-threaded end terminating in a seat for a ball bearing and having a hollow end with an outstanding flange, a hollow pointed valve element mounted in the hollow end of the spindle, a limit plate and a diaphragm gripped at their edges by the said annular seats and spaced apart at their centers of which that of the diaphragm is held between the spindle flange and the valve point, an adjustable spring mounted between the limit plate and a nut on the screw-threaded end of the spindle, and means to adjust the valve comprising a bonnet screw-threaded in the housing and bearing upon the spindle through a ball mounted in the terminal seat thereof.

2. A valve comprising a threaded base having inlet and outlet passages therethrough and having an annular seat for a membrane and a conical surface proceeding therefrom terminating in a valve seat at the end of one of said passages, a housing threaded on the base and having an annular seat for a limit plate and a conical surface proceeding therefrom terminating in a screw-threaded cylinder having a limiting flange at its end, a sub-assembly for the interior of the assembled base and housing comprising a spindle having a screw-threaded end terminating in a seat for a ball bearing and having a hollow end with a flange, a hollow pointed valve element mounted in the hollow end of the spindle, a limit plate and a diaphragm gripped at their edges by the said annular seats and spaced apart at their centers of which that of the diaphragm is held between the spindle flange and the valve point, a spring mounted between the limit plate and a nut on the screw-threaded end of the spindle, and means to adjust the valve comprising a bonnet screw-threaded in the housing and bearing upon the spindle through a ball mounted in the terminal seat thereof.

3. A valve comprising a threaded base having inlet and outlet passages therethrough and having an annular seat for a membrane and a surface proceeding therefrom terminating in a valve seat at the end of one of said passages, a housing mounted on the base having a seat for a limit plate and a surface proceeding therefrom terminating in a screw-threaded cylinder, a flanged spindle having a screw-threaded end with a bearing seat, a valve element mounted in an end of the spindle, a limit plate and a diaphragm gripped at their edges by the said annular seats and spaced apart at their centers of which that of the diaphragm is held between the flange on said spindle and the valve element, a spring mounted between the limit plate and a nut on the screw-threaded end of the spindle, and means to adjust the valve comprising a bonnet screw-threaded in the housing and bearing upon the spindle through a ball mounted in the bearing seat thereof.

4. A valve comprising a threaded base having inlet and outlet passages therethrough and having an annular seat for a membrane and a surface proceeding therefrom terminating in a valve seat at the end of one of said passages, a housing mounted on the base having a seat for a limit plate and a surface proceeding therefrom terminating in a screw-threaded cylinder, a spindle having a screw-threaded end with a bearing seat, a valve element mounted on the other end of the spindle, a limit plate, a spring mounted between the limit plate and a nut on the screw-threaded end of the spindle, and means acting through said bearing seat to adjust the valve by moving the spindle against the thrust of the spring.

WILBUR O. TEETERS.

REFERENCES CITED

The following references are of record in the file of this patent:

UNITED STATES PATENTS

| Number | Name | Date |
|---|---|---|
| 167,010 | Moffet | Aug. 24, 1875 |
| 679,062 | Stadeli | July 23, 1901 |
| 877,875 | Van Nostran | Jan. 28, 1908 |
| 1,067,102 | Failing | July 8, 1913 |
| 1,672,575 | McIntosh | June 5, 1928 |
| 1,893,380 | Uschman et al. | Jan. 3, 1933 |
| 1,977,015 | Rodler | Oct. 16, 1934 |
| 2,061,028 | Forbes | Nov. 17, 1936 |
| 2,306,291 | Alons | Dec. 22, 1942 |
| 2,316,506 | Doelker | Apr. 13, 1943 |

FOREIGN PATENTS

| Number | Country | Date |
|---|---|---|
| 12,619 | Great Britain | of 1895 |

OTHER REFERENCES

G. E. Review, February 1944, pages 17 and 18. Copy in Science Library.